(12) United States Patent
Foller et al.

(10) Patent No.: US 8,373,919 B2
(45) Date of Patent: Feb. 12, 2013

(54) OPTICAL ELEMENT HAVING AN APODIZED APERTURE

(75) Inventors: Peter C. Foller, Murrysville, PA (US);
Robert H. Tang, Murrysville, PA (US);
Forrest R. Blackburn, Monroeville, PA (US); Robert W. Walters, Export, PA (US); Kevin W. Seybert, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 204 days.

(21) Appl. No.: 12/629,521

(22) Filed: Dec. 2, 2009

(65) Prior Publication Data
US 2010/0134866 A1 Jun. 3, 2010

Related U.S. Application Data

(60) Provisional application No. 61/119,393, filed on Dec. 3, 2008.

(51) Int. Cl.
*G02F 1/153* (2006.01)

(52) U.S. Cl. ......... 359/267; 359/268; 359/270; 359/273

(58) Field of Classification Search ........... 359/265–275
See application file for complete search history.

(56) References Cited

U.S. PATENT DOCUMENTS

| | | | |
|---|---|---|---|
| 4,110,015 A | 8/1978 | Reddy | |
| 4,297,401 A | 10/1981 | Chern et al. | |
| 4,309,082 A | 1/1982 | Kohara et al. | |
| 4,418,102 A | 11/1983 | Ferrato | |
| 4,695,490 A | 9/1987 | McClelland et al. | |
| 4,902,108 A | 2/1990 | Byker | |
| 5,596,023 A | 1/1997 | Tsubota et al. | |
| 5,596,024 A | 1/1997 | Horie et al. | |
| 6,020,987 A | 2/2000 | Baumann et al. | |
| 6,621,616 B1 | 9/2003 | Bauer et al. | |
| 6,963,437 B2 | 11/2005 | Bauer et al. | |
| 7,245,347 B2 | 7/2007 | Lundgren | |

OTHER PUBLICATIONS

*Electrochromism and Electrochromic Devices*, Monk et al., Cambridge University Press 2007, Chapter 11, pp. 341-373, incorporated herein by reference in its entirety.
Schott North America (solder glasses)[online]. Retrieved from: http://www.us.schott.com/epackaging/english/glass/technical_powder/solder.html.
U.S. Appl. No. 61/119,393, Optical Element Having An Apodized Aperture, filed Dec. 3, 2008.

*Primary Examiner* — Evelyn A. Lester
(74) *Attorney, Agent, or Firm* — Deborah M. Altman; Frank P. Mallak

(57) ABSTRACT

Provided is an optical element with an electrochromic apodized aperture having variable light transmittance in response to the amplitude of an applied voltage. The apodized aperture includes (i) a first substrate having a planar inner surface and an outer surface, (ii) a second substrate having an outer surface and a non-planar inner surface opposing and spaced from the planar inner surface of the first substrate, wherein each of the planar inner surface of the first substrate and the non-planar inner surface of the second substrate has an at least partial layer of transparent conductive material thereover; and (iii) an electrochromic medium disposed between the planar inner surface of the first substrate and the non-planar inner surface of the second substrate.

32 Claims, 10 Drawing Sheets

OPTICAL ELEMENT HAVING AN APODIZED APERTURE

CROSS-REFERENCE TO RELATED APPLICATIONS

This application claims the benefit of priority from U.S. Provisional Patent Application No. 61/119,393, filed Dec. 3, 2008, which is incorporated by reference herein in its entirety.

FIELD OF THE INVENTION

The present invention relates to an optical element comprised of an electrochromic apodized aperture having variable light transmittance in response to the magnitude of an applied electrical voltage.

BACKGROUND OF THE INVENTION

The makers of mobile communication devices such as cellular telephones continue to increase functionality of these devices. For example, at present cellular telephones can include still and video cameras, video streaming and/or two-way video calling capabilities. Users can capture still or video images and transmit the image or video files via a network. While the trend to increase functionality continues, manufacturers also continue to reduce the size of such communication devices.

The reduced size of such mobile communication devices have restricted the use of diaphragms with adjustable apertures or irises in the cameras contained therein. A mechanical camera iris is a diaphragm having a variable opening for a camera lens to alter the amount of light being admitted as well as to adjust the depth of field available for the image. Such mechanical irises are utilized in most film cameras and in many digital cameras. A mechanical iris is not practical for use in mobile communication devices because it would add too much bulk, increased costs, and may have unreliable performance. Thus, manufacturers typically do not include adjustable irises in cellular telephones. The consequence is that cellular telephones neither produce good quality images at low light levels (due to, for example, objectionable shot noise and readout noise) nor at high light levels due, for example, to the inability to adequately decrease integration times thereby creating over-saturation problems. Cellular telephone cameras also can exhibit poor depth of field and reduced image sharpness due to lens aberration.

SUMMARY OF THE INVENTION

The present invention is directed to an optical element comprising an electrochromic apodized aperture having variable light transmittance in response to the magnitude of applied electrical voltage. The apodized aperture comprises (i) a first substrate having an outer surface and a planar inner surface, (ii) a second substrate having an outer surface and a non-planar inner surface opposing the planar inner surface of the first substrate, and (iii) an electrochromic medium disposed between the planar inner surface of the first substrate and the non-planar surface of the second substrate. Each of the planar inner surface of the first substrate and the non-planar inner surface of the second substrate has an at least partial layer of conductive material thereover.

Also, the present invention is directed to an optical element comprising an electrochromic apodized aperture having variable light transmittance in response to the magnitude of an applied electrical voltage. The apodized aperture comprises (i) a first substrate having an outer surface and a planar inner surface, and (ii) a second substrate having an outer surface and a convex inner surface opposing and spaced from the planar inner surface of the first substrate to form a cavity therebetween. Each of the planar inner surface and the convex inner surface has an at least partial layer of transparent conductive material thereover; and (iii) an electrochromic medium disposed within the cavity.

BRIEF DESCRIPTION OF THE SEVERAL VIEWS OF THE DRAWING(S)

Various non-limiting embodiments disclosed herein will be better understood when read in conjunction with the drawings, in which.

DETAILED DESCRIPTION OF THE INVENTION

Figure 1:
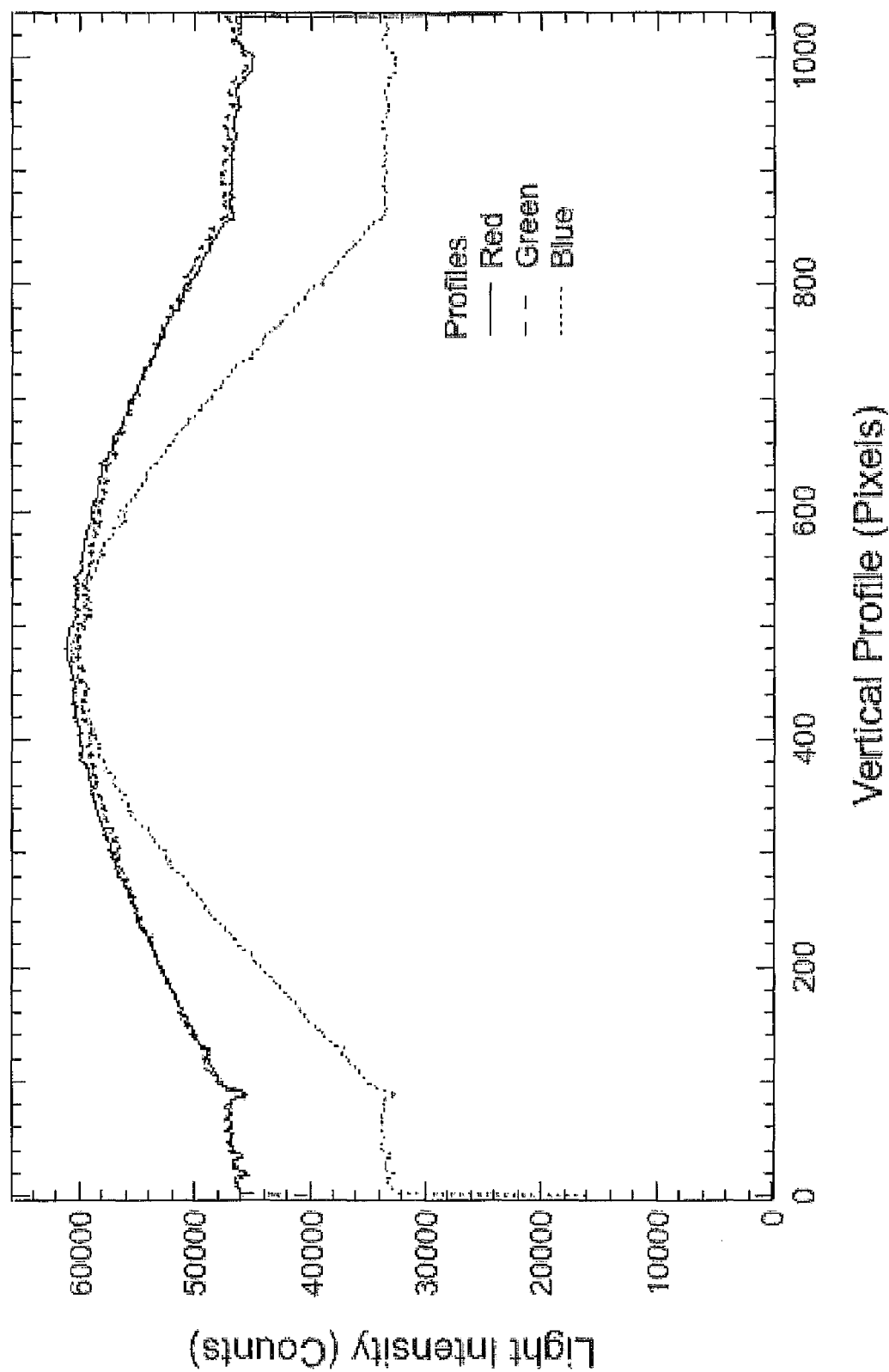
FIG. 1 is a profile of an initial image of the aperture of the Example at time 0 determined as described herein.

As used in this specification and the appended claims, the articles "a", "an", and "the" include plural references unless expressly and unequivocally limited to one referent.

Additionally, for the purposes of this specification, unless otherwise indicated, all numbers expressing quantities of ingredients, reaction conditions, and other properties or parameters used in the specification are to be understood as being modified in all instances by the term "about." Accordingly, unless otherwise indicated, it should be understood that the numerical parameters set forth in the following specification and attached claims are approximations. At the very least, and not as an attempt to limit the application of the doctrine of equivalents to the scope of the claims, numerical parameters should be read in light of the number of reported significant digits and the application of ordinary rounding techniques.

All numerical ranges herein include all numerical values and ranges of all numerical values within the recited ranges. Further, while the numerical ranges and parameters setting forth the broad scope of the invention are approximations as discussed herein, the numerical values set forth in the Examples section are reported as precisely as possible. It should be understood, however, that such numerical values inherently contain certain errors resulting from the measurement equipment and/or measuring technique.

The present disclosure describes several different features and aspects of the invention with reference to various exemplary embodiments. It is understood, however, that the invention embraces numerous alternative embodiments, which may be accomplished by combining any of the different features, aspects, and embodiments described herein in any combination that one of ordinary skill in the art would find useful.

As previously mentioned, the present invention provides an optical element 100, as referenced in FIGS. 10A-D, comprising an electrochromic apodized aperture having variable light transmittance in response to the magnitude of an applied electrical voltage. The apodized aperture 100 comprises:

(I) a first substrate 102, as referenced in FIGS. 10A-D, having an outer surface and a planar inner surface, (ii) a second substrate 102 having an outer surface and a non-planar inner surface 106, as referenced in FIGS. 10A-D, opposing and spaced from the planar inner surface of the first substrate 102, and (iii) an electrochromic medium 110, as referenced in FIGS. 10A-D, disposed between the planar inner surface of the first substrate 102 and the non-planar surface 106 of the second substrate 102. Each of the planar inner surface of the first substrate 102 and the non-planar inner surface 106 of the second substrate has an at least partial layer of conductive material 104 thereover. The respective refractive indices of the second substrate 102, and the electrochromic medium 110 can be substantially the same. Also, the refractive index of the first substrate 102 (i) is substantially the same as the respective refractive indices of the second substrate 102 (ii) and the electrochromic medium 110 (iii). In the optical element 100 of the present invention, a center region of the apodized aperture 100 defines a "pupilary region" wherein the amount of the electrochromic medium 110 is significantly less than that present in the remainder of the apodized aperture 100. This serves to minimize (or eliminate altogether) coloration in this pupilary region. It has been found that the electrochromic aperture 100 of the present invention offers several advantages over those previously known, and, in particular, those where both of the opposing substrates 102 are convex, or both of the opposing substrates 102 are concave. The electrochromic apodized aperture 100 of the present invention offers less complexity in design (e.g., alignment of the two inner surfaces of the opposing substrates 100 is not as critical) and thus less complexity in the manufacture of the apodized aperture 100.

The first substrate 102 (I) and the second substrate 102 (ii) can be comprised of the same or different materials. For example, the first and second substrates 102 can comprise glass, such as fused silica or fused quartz, or polymeric substrate materials. The first substrate 102 (i) can comprise glass, and the second substrate 102 can comprise a polymeric substrate material or vice versa. Likewise, the first substrate 102 (i) can comprise glass, and the second substrate 102 (ii) can comprise glass. Alternatively, the first substrate 102 (i) can comprise polymeric substrate material, and the second substrate 102 (ii) can comprise polymeric substrate material.

Suitable glass substrates 102 can include but are not limited to any of those widely known (e.g., fused silica and fused quartz as previously mentioned) and can include those having a refractive index of 1.40 or greater, or 1.45 or greater, such as 1.50 or greater, or 1.65 or greater. In a particular embodiment of the present invention, the substrate 102 (i) and/or the substrate 102 (ii) can comprise a glass having a refractive index of 1.40 to 1.75.

Suitable polymeric substrates 102 can include without limitation polycarbonate, polystyrene, polyurethane, polyurethane(urea), polyester, polyacrylate, polymethacrylate, poly(cyclic) olefin, polyepoxy, copolymers thereof, or mixtures of any of the foregoing. The polymeric substrates 102 can comprise a combination of any of the foregoing substrates, for example, in the form of a multilayer laminate. The polymeric substrates 102 can be formed by any manufacturing means known in the art such as by casting or molding, e.g., injection molding, techniques. In a particular embodiment of the present invention the polymeric substrate 102 comprises polycarbonates, poly(cyclic) olefins, polystyrenes, polyurethanes, polymethacrylates, co-polymers of any of the foregoing materials, or mixtures of any of the foregoing. Typically, both of the substrates 102 (i) and (ii) are transparent (i.e., optically clear), however for some applications one or both may be tinted or otherwise colored. As used herein, by "transparent" is meant a substrate that has a luminous transmittance of at least 70 percent, such as at least 80 percent, or at least 85 percent. Suitable polymeric substrates 102 can include without limitation those having a refractive index ranging from 1.30 to 1.75, such as from 1.35 to 1.70.

Figure 10A:
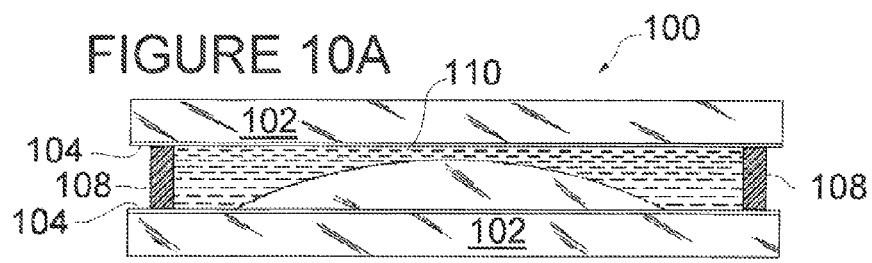
FIGS. 10A-D are schematic cross section views of the optical element according to the present invention.

As previously mentioned, the first substrate 102 (i) has an outer surface and a planar inner surface, and the second substrate 102 (ii) has an outer surface and a non-planar inner surface 106 opposing the planar inner surface of the first substrate 102. The non-planar inner surface 106 of the second substrate 102 (ii) typically is convex but may have a different non-planar surface topography where desired, for example a spherical, parabolic, or hyperbolic topography. In a particular embodiment, the second substrate 102 (ii) (which has a non-planar inner surface) can comprise a planar substrate having a partial-sphere or a half-sphere of the same or different material affixed to the inner surface, thus forming a convex inner surface as shown in FIG. 10A. Such a partial-sphere or a half-sphere configuration can be formed, for example, by dispensing a UV-curable acrylic or epoxy resin material onto a planar surface of a glass or polymeric substrate. This configuration provides flexibility for refractive index matching of the substrates 102 and the electrochromic medium 110 disposed therebetween as discussed below.

Figure 10B:
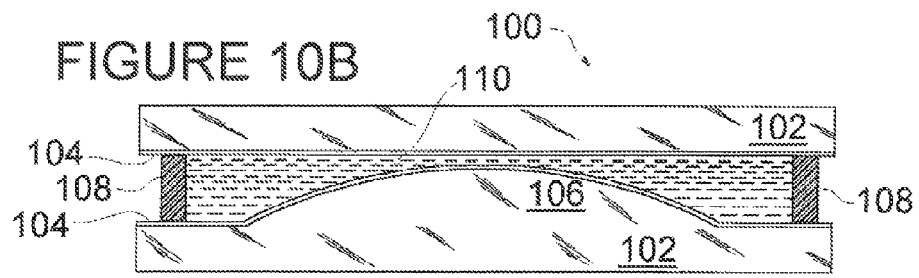
Figure 10C:
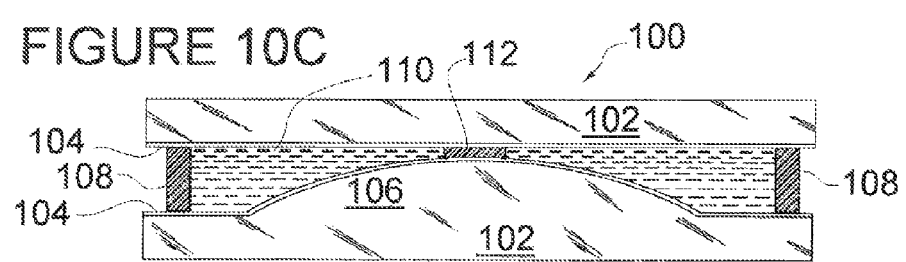
Figure 10D:
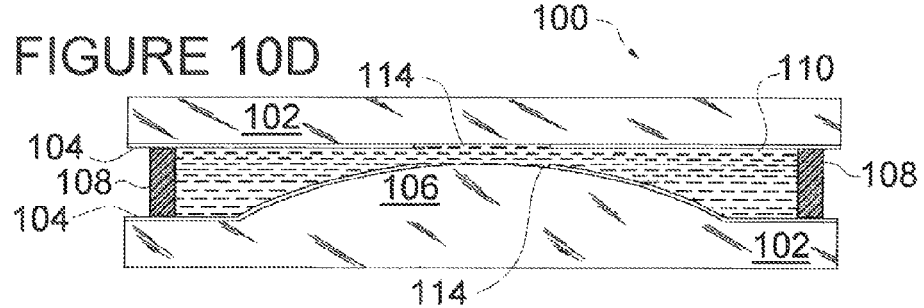

Alternatively, the second substrate 102 (ii) can be a unitary piece as shown in FIGS. 10B-D having a convex inner surface 106 comprised of any of the aforementioned substrate materials. In any event, the curvature of the convex inner surface 106 of the second substrate 102 (ii) is selected such that maximum apodization of the aperture 100 is achieved.

At least one of the outer surface of the first substrate 102 (i) and the outer surface of the second substrate 102 (ii) can be substantially planar, that is, at least one of the respective outer surfaces can be essentially free of any wavefront distortion.

As aforementioned, each of the planar inner surfaces of the first substrate 102 (i) and the non-planar inner surface 106 of the substrate 102 (ii) has an at least partial layer of transparent conductive material 104, as referenced in FIGS. 10A-D, thereover. The conductive material 104 can be selected from any of those widely known in the field of electrochromic devices. For purposes of the present invention, the conductive material 104 typically comprises a transparent conductive material selected from carbon nanotubes, gold, tin oxide, fluorine-doped tin oxide, indium tin oxide, and/or one or more conductive polymers. Non-limiting examples of suitable conductive polymers can include poly(acetylene), poly (pyrrole), poly(thiophene), poly(aniline), poly(fluorene), poly(pyridene), poly(indole), poly(carbazole), poly(azine), poly(quinone), poly(3-alkylthiophene), polytetrathiafulvalene, polynaphthalene, poly(p-phenylene sulfide), and/or poly(para-phenylene vinylene). For a detailed discussion of suitable conductive polymers, see Handbook of Conducting Polymers, 2.sup.nd ed., rev'd., Marcel Dekker, Inc., New York 1998. In the optical element 100 of the present invention, the at least partial layer of transparent conductive material 104 on the respective inner surfaces of the first substrate 102 (i) and the second substrate 102 (ii) provides a surface conductivity ranging from 1 to 1000 ohm(s)/square, for example from 1 to 500 ohm(s)/square, such as from 1 to 100 ohm(s)/square, or 3 to 80 ohms/square, or from 5 to 50 ohms/square.

In a particular embodiment of the present invention, the at least partial layer of transparent conductive material 104 on the non-planar inner surface 106 of the second substrate 102 (ii) opposes and is spaced from the at least partial layer of transparent conductive material 104 on the planar inner surface of the first substrate 102 (i). The spacing distance therebetween is dependent upon a number of factors, including but not limited to the concentration of the electrochromic medium 110 and the topography of the inner surface 106 of the second substrate 102 (ii). Taking into account such factors, the spacing distance is selected such that the coloration of the electrochromic medium 110 within the pupilary region of the apodized aperture 100 is minimized or eliminated altogether. The transparent conductive material 104 on at least one of the inner surface of the first substrate 102 (i) and the inner surface 106 of the second substrate 102 (ii) can be electrically isolated in the pupilary region as shown in FIGS. 10C-D. By the term "electrically isolated" in the pupilary region is meant that the transparent conductive material 104 within the pupilary region on the inner surface of the first substrate 102 (i) is isolated or insulated (e.g., as described below) from electrical communication with the transparent conductive material 104 of the second substrate 102 (ii) or vice versa. This permits direct contact between (i.e., no spacing between the respective inner surfaces) the respective inner surfaces of the substrates 102 (i) and (ii) without effecting a short circuit.

It is contemplated that one or both of the respective inner surfaces of the first substrate 102 (i) and the second substrate 102 (ii) can be essentially free of the transparent conductive material 104 in the pupilary region 114, as referenced in FIG. 10D, of the apodized aperture 100. This configuration provides an apodized aperture 100 wherein there is no spacing between the first and second substrates 102 within the pupilary region 114 (without creating a short circuit) and thus there is no coloration in the pupilary region 114. The apodized aperture 100 which is essentially free of transparent conductive material 104 in the pupilary region 114 can be achieved by simply masking the pupilary region 114 of one or both of the respective inner surfaces of substrates 102 (i) and/or (ii), then applying the transparent conductive material 104 to the inner surface(s), and subsequently removing the mask to provide a pupilary region 114 free of transparent conductive material 104 as shown in FIG. 10D.

Alternatively, the transparent conductive material 104 in the pupilary region 114 of one or both of the respective inner surfaces can be at least partially removed, for example, by laser ablation techniques. In one embodiment, the transparent conductive material 104 on a central portion of the pupilary region of the inner surface of the first substrate 102 (i) and/or the inner surface 106 of the second substrate 102 (ii) can be isolated from the remaining portion of the transparent conductive material 104 on that inner surface by removing a fine line of the conductive material 104 around the central portion using laser ablation techniques (i.e., creating an "island" of conductive material 104 separated from the remaining conductive material 104 layer on that inner surface). This permits direct contact of the respective inner surfaces of the two substrates 102 (i.e., no spacing between the two) without creating a short circuit.

Likewise, the transparent conductive material 104 on a central portion of the pupilary region of the inner surface of the first substrate 102 (i) and/or the inner surface 106 of the second substrate 102 (ii) can be insulated from the remaining portion of the transparent conductive material 104 on that inner surface by applying a non-conductive organic or inorganic coating material 112, as reference in FIG. 10C, (including any of those known in the art) onto the central portion of the pupilary region (i.e., creating an "island" of non-conductive material 112 over the conductive material 104 on that inner surface). This permits direct contact of the respective inner surfaces of the two substrates 102 (i.e., no spacing between the two) without creating a short circuit.

In a particular embodiment of the present invention, the non-planar inner surface 106 of the second substrate 102 (ii) is essentially free of the transparent conductive material 104 in the pupilary region. In this alternative embodiment, the pupilary region of the inner surface 106 of the second substrate 102 (ii) which is essentially free of the transparent conductive material 104 can be in direct contact with the transparent conductive material 104 on the planar inner surface of the first substrate 102 (i), provided that the conductive material 104 which is present on the inner surface 106 of the second substrate 102 (ii) outside the pupilary region does not contact the conductive material 104 on the inner surface of the first substrate 102 (i).

An electrochromic medium 110 (iii) is disposed between the conductive layer 104 on the planar inner surface of the first substrate 102 (i) and the conductive layer 104 on the non-planar inner surface 106 of the second substrate 102 (ii). The electrochromic medium 110 (iii) can comprise any of the electrochromic materials known in the art, and can be in any known form (for example, in the form of a liquid, a gel, or a polymeric material). For example, the electrochromic medium 110 (iii) can be in the form of solvent-phase electrochromic medium. For purposes of the present invention, the terms "solvent-phase electrochromic medium" or "solution-phase electrochromic medium" are intended to include electrochromic media in the form of a liquid as well as a gel. In a particular embodiment of the present invention, the electrochromic medium 110 comprises a solvent-phase electrochromic medium in the form of a liquid. The electrochromic medium 110 includes at least one electrochromic compound or dye, which varies in color or darkness in response to an applied voltage. Typically, the electrochromic medium 110 used in the optical element of the present invention includes electroactive cathodic and anodic materials. In solution-phase electrochromic media, the electrochromic compounds)/dye(s) are contained in a solution in an ionically conducting electrolyte. The material remains in solution when electrochemically reduced or oxidized.

Generally, the solvent-phase electrochromic medium 110 contains at least one anodic electroactive dye, at least one cathodic electroactive dye, and a small amount of salt(s) that is/are soluble in a suitable solvent. When a DC voltage is applied across the two respective transparent conductive layers 104 (typically separated by a low K material, e.g. a gasket or seal member), the anodic dyes are electrochemically oxidized at the surface of the anode and the cathodic dyes are electrochemically reduced at the surface of cathode. Color formation is accomplished when the molar extinction coefficient of the anodic dye and/or cathodic dye in the solvent-phase electrochromic medium 110, change with their electrochemical reactions. Generally, at least one of the dyes undergoes a significant increase in extinction coefficient at a wavelength in the visible range. These colored species are free to diffuse from the electrodes 104 (i.e., the respective transparent conductive layers) and meet each other in the bulk of the electrochromic medium 110. A redox reaction takes place between the two electrochemically changed dyes to regenerate their respective original states (i.e., the bleached or non-colored states). The final coloration of the apodized aperture 100 is the result of an equilibrium between the electrochemical reaction at the electrode surfaces 104 (i.e., the respective surfaces of the transparent conductive layers) and a diffusion controlled redox reaction in the bulk of the solvent-phase electrochromic medium 110. In such a "self erasing cell", a current at a given applied voltage is required to maintain the apodized aperture 100 in the colored state. Without the applied voltage, the cell will eventually return to its original bleached state.

Notwithstanding the foregoing, the electrochromic coloration within the electrochromic apodized aperture 100 can be enhanced by applying a progression of voltage pulses. The pulses can be applied either by pulsing voltage on and off, or by pulsing between two different applied voltages, and/or by pulsing to reverse polarity in order to reverse current flow direction. Coloration and de-coloration can be affected by adjusting (either individually or in any combination) the amplitude of applied voltage pulses (in either the positive or negative direction), the pulse time, and/or pulse frequency.

Also, it is contemplated that the apodized aperture 100 can be structured to accommodate the resistive heating of the apodized aperture 100, for example, through the use of a quick burst of battery power through one or both of the transparent conductive layers 104 in plane (and not across the electrochromic medium 110). Heating the aperture 100 not only serves to increase the kinetics of coloration of the electrochromic medium 110, but also to increase the rate of fading back to the bleached state ("fade rate").

The electrochromic medium 110 employed in the optical element 100 of the present invention can comprise any of the electrochromic compounds known in the art, including, for example, phenazine compounds, such as dihydro-phenazine compounds, and/or dipyridinium (i.e., viologen) compounds. Suitable non-limiting examples of such phenazine compounds and the preparation thereof can include those described in U.S. Pat. No. 6,020,987 at column 31, line 43, column 34, line 7, and in U.S. Pat. No. 4,902,108 at column 13, line 49 to column 15, line 42, the cited portions of which are incorporated herein by reference. Suitable non-limiting examples of viologen compounds include those described in U.S. Pat. No. 6,020,987 at column 34, line 8-55, incorporated herein by reference. See also, Electrochromism and Electrochromic Devices, Monk et al., Cambridge University Press 2007, Chapter 11, pp. 341-373, incorporated herein by reference in its entirety. Specific examples of suitable anodic electrochromic dyes can include but are not limited to 5,10-dihydro-5,10-dimethylphenazene, N,N,N,N'-tetramethyl-1,4-phenylenediamine, 10-methylphenothiazine, 10-ethylphenothiazine, tetrathiafulvalene, ferrocene and derivatives thereof, and/or triarylamines and derivatives thereof. Specific examples of suitable cathodic electrochromic dyes can include but are not limited to 1,1'-diphenyl-4,4'-bipyridinium difluoroborate, 1,1'-di(n-heptyl)-4,4' bipyridinium difluoroborate, 1,1'-dibenzyl-4,4' bipyridinium defluoroborate, and/or 1,1'-di(n-propylphenyl)-4,4'-bipyridinium difluoroborate.

In addition, the electrochromic medium 110 also may include other materials such as solvents (e.g., polar aprotic solvents), light absorbers, light stabilizers, thermal stabilizers, antioxidants, thickeners or viscosity modifiers (e.g., polyvinylpyrrolidone), and free standing gel, including polymer matrices. The electrochromic medium 110 can include a solvent comprising propylene carbonate, benzonitrile, phenoxyacetonitrile, diphenyl acetonitrile, sulfolane, sulfolate, and/or phosphoramide. Other useful solvents can include, but are not limited to phosphoric esters such as tricresyl phosphate, cresyl phosphate and the like, amides such as N,N-dimethylformamide, methylpropionamide, N-methylpyrrolidone, hexamethylphosphonamide, diethylformamide, tetramethylurea and the like, nitriles such as acetonitrile, sulfoxides such as dimethylsulfoxide, esters such as ethyl acetate, butyl acetate, dioctyl phthalate and the like, carbonates such as propylene carbonate, ethylene carbonate and the like, lactones such as .gamma.-butyrolactone, ketones such as methyl ethyl ketone, methyl isobutyl ketone and the like. Any of the aforementioned solvents may be used singly or in any combination. The viscosity of the solvent can influence the response speed of the electrochromic coloration. Thus, when higher response speeds are needed, solvents of lower viscosity typically are used.

Additionally, the solution-phase electrochromic medium 110 can comprise a dissolved electrolyte, for example, tetrabutylammonium tetrafluoroborate and/or tetrabutylammonium bromide to provide ionic conductivity to the solution. Electrolyte materials suitable for this purpose are well known in the art.

As previously mentioned, in the optical element 100 of the present invention, the refractive indices of the second substrate 102 (ii), and the electrochromic medium 110 (iii) can be substantially the same. By "substantially the same" refractive index is meant that the difference between the respective refractive indices of each of the second substrate 102 (ii), and the electrochromic medium 110 (iii) is not more than +/−0.005, for example not more than +/−0.004, or not more than +/−0.003, or not more than +/−0.002. Thus, the second substrate 102 (ii) and the composition of the electrochromic medium 110 (iii) are selected such that the respective refractive indices of (ii) and (iii) are substantially the same. Also, the respective refractive indices of the first substrate 102 (i), the second substrate 102 (ii), and the electrochromic medium 110 (iii) can be substantially the same. Such a "match" of refractive indices of 102 (ii) and 110 (iii), and where desired 102 (i), provides an optical element 100 having excellent optical qualities.

It should be noted that if the differences between the respective refractive indices of the substrate 102 (ii) and the electrochromic medium 110 (iii), and, where desired, the first substrate 102 (i), are greater than those values stated above, for example, a difference of about +/−0.01, or a difference of about +/−0.1, the optics of the optical device in which the apodized aperture 100 is employed, (e.g., a cellular telephone camera) could be modified to adjust for this lack of refractive index matching. Simply put, in some instances it may not be desirable to "match" the refractive indices of 102 (ii) and 110 (iii), and where desired 102 (i), as discussed above. In such instances, the optical power of the optical element 100 can be maintained by adjusting the various components of the optical element 100 itself, and/or by adjusting one or more of the components of the device in which the optical element 100 is employed. For example, when the apodized aperture 100 is used in a cellular telephone camera, the apodized aperture 100 can be used in conjunction with a camera lens having a particular power. Likewise, power can be introduced in one or both of the substrates 102 of the apodized aperture 100 itself. The apodized aperture 100 itself may be used as a lens by balancing the respective shapes and refractive indices of the first and second substrates 102, as well as by adjusting the electrochromic medium 110.

In the optical element 100 of the present invention, the electrochromic apodized aperture 100 can further comprise at least one seal member 108, referenced in FIGS. 10A-D, (iv) about the outer perimeter of the apodized aperture 100 and in contact with the first substrate 102 (i), the second substrate 102 (ii), and the electrochromic medium 110 (iii) to protect and contain the electrochromic medium 110 between the transparent conductive layers 104 on the respective inner surfaces of the first and second substrates 102. Such a seal member 108 should be comprised of a material having good adhesion to glass and/or polymeric substrate 102 materials, and to the conductive layers 104. Also, the seal member 104 should exhibit low permeabilities for oxygen, moisture vapor and other gases, and should not interact with or contaminate the electrochromic medium 110 it is meant to contact and contain. Suitable materials for use as the seal member 108 include, but are not limited to thermoplastic, thermosetting and UV curing organic sealing resins such as any of those known for use in liquid crystal devices. (See U.S. Pat. Nos. 4,297,401, 4,418,102, 4,695,490, 5,596,023, and 5,596,024.) Suitable materials for use as the perimeter seal member 108 are low K materials as mentioned above. Several non-limiting examples of suitable seal materials can include those based on epoxy, polyolefin (such as polypropylene, polyethylene, copolymers and mixtures thereof), silicones, polyesters, polyamides and/or polyurethane resins. Any of the aforementioned materials can be silane-modified to enhance the bonding thereof to the substrate materials, e.g. glass. Suitable adhesives can be used where appropriate to adhere the seal member 108 to the substrates 102 (i) and (ii).

Also, it should be noted that of one or more adhesives such as any of those known in the art, can constitute the seal member 108. Suitable adhesives for the purpose can include but are not limited to adhesives based on thermoplastic, thermosetting and UV curing organic resins. Suitable adhesives can include, for example, those based on epoxy, polyolefin (such as polypropylene, polyethylene, copolymers and mixtures thereof), silicones, polyesters, polyamides and/or polyurethane resins. The use of solder glass materials such as those described at http://www.us.schott.com/epackaging/english/glass/technical_powder/solder.html is contemplated as well.

Obviously, any physical contact between the respective transparent conductive layers 104 provided on the inner surface of the substrate 102 (i) and on the inner surface 106 of the substrate 102 (ii) (which serve as electrodes) should be avoided in order to prevent shorting (i.e., a short circuit) during operation of the apodized aperture 100. Thus, in particular embodiments of the present invention, the respective transparent conductive layers 104 should be spaced one from the other. The aforementioned seal member 108 itself can serve as a spacer, and/or separate optical element members comprised of insulating materials can be used as spacers to maintain the physical separation of the respective transparent conductive layers 104.

As used herein, the term "apodized" and related terms (e.g., apodizing, apodization, etc.) refer to an aperture 100, which has a smooth and gradual transition along its radius from the greatest percentage of transmitted light (e.g., at the center of the aperture 100) to the lowest percentage of transmitted light (e.g., at the edges of the aperture 100). A fully apodized aperture 100 would be one for which light transmittance (T) varies along its radius (x) as a Gaussian curve (that is, $T=\exp(\alpha x^2)$). When employed as an optical element, for example, as a camera iris, the electrochromic apodized aperture 100 of the present invention emulates the pupil of the human eye in that it facilitates automatic "dilation" and "constriction". As the excitation energy increases, the aperture 100 constricts so as to reduce the amount of light through the lens. The constricting aperture 100 enabled by the present invention changes (i.e, increases) the effective f-number of the lens system and therefore increases its depth of field. Similarly, as the excitation energy decreases, the aperture 100 dilates so as to increase the amount of light through the lens. As the aperture 100 becomes completely transparent the full aperture 100 is limited only by the lens mechanical stop (assuming no other system elements serve as limiting factors). Thus, the apodized aperture 100 is characterized by a Gaussian radial transmittance curve. The thickness of the electrochromic medium 110 increases along a radius of the apodized aperture 100 and varies with the non-planar (e.g., convex) inner surface 106 of the second substrate 102.

Generally, the at least partial layers of transparent conductive material 104 on the inner surface of the first substrate 102 (i) and the inner surface 106 of the second substrate 102 (ii) serve as counter-conducting electrodes in electrical communication with a controller which is operable to energize the electrochromic aperture 110 by applying an electrical voltage thereto. The magnitude of the electrical voltage applied varies in response to light conditions as determined, for example, by a photo sensor, such as the CMOS image sensor of a typical cell phone camera module. As previously mentioned, the present invention provides an apodized aperture 100 which "opens" to allow a greater amount of light to pass through in low lighting conditions (i.e., where the electrochromic medium 110 is de-energized by reducing or removing application of voltage); and which "closes" to attenuate or block a portion of light when conditions are brighter (i.e., where the electrochromic medium 110 is energized by application of an applied voltage). The electrochromic medium 110 thus provides an apodized aperture 110 having a smooth and gradual transition along its radius from the greatest percentage of transmitted light (e.g., at the center of the aperture 100 in the pupilary region) to the lowest percentage of transmitted light (e.g., at the edges of the aperture 100) in order to provide improved resolution and overall focusing, for example by a lens and sensor. The electrochromic medium 110 may be automatically energized and/or de-energized and/or continuously varied in response to changes in the sensed lighting conditions surrounding the imaging array sensor, thereby providing improved illumination of the sensor during low light conditions while further providing improved focusing and greater control of lens aberrations during higher light conditions.

In a particular embodiment, the present invention is directed to an optical element comprising an electrochromic apodized aperture 100 having variable light transmittance in response to the magnitude of an applied electrical voltage, the apodized aperture 100 comprising: (i) a first substrate 102 having an outer surface and a planar inner surface, and (ii) a second substrate 102 having an outer surface and a convex inner surface 106 opposing and spaced from the planar inner surface of the first substrate 102 to form a cavity therebetween, wherein each of the planar inner surface and the convex inner surface 106 has an at least partial layer of transparent conductive material 104 thereover, the conductive material 104 comprising, for example, indium tin oxide; and (iii) an electrochromic medium 110 disposed within the cavity. The refractive indices of the second substrate 102, and the electrochromic medium 110 can differ by not more than +/−0.003. In this embodiment, the electrochromic apodized aperture 100 further can comprise a seal member 108 (iv) comprised of any of the aforementioned seal member materials about the outer perimeter of the apodized aperture 100 and in contact with the first substrate 102 (i), the second substrate 102 (ii), and the electrochromic medium 110 (iii). A suitable adhesive can be used to affix the seal member 108 to the substrates 102 (i) and (ii), or the adhesive itself can serve as the seal member 108. The refractive indices of 102 (i), 102

(ii) and 110 (iii) can differ by not more than +/−0.003. Further, at least one of the outer surface of 102 (i) and the outer surface of 102 (ii) is substantially planar.

The electrochromic apodized aperture 102 of the present invention usually is implemented in conjunction with a pixilated imaging array sensor, such as a CCD or CMOS chip. However, the electrochromic apodized aperture 100 can be implemented in conjunction with other types of sensors, and may be implemented with or without a color filter or process associated with the sensor, without affecting the scope of the present invention.

In any of the optical element(s) of the present invention the respective outer surfaces of the first and second substrates 102 of the apodized aperture 100 can be at least partially coated with at least one coating chosen from protective coatings, such as hard coats and/or abrasion-resistant coatings, antireflective ("AR") coatings, antifogging coatings, oxygen barrier coatings and/or infra-red (IR) absorbing coatings and/or IR reflective coatings, and/or conventional reflective coatings connected to at least a portion of the outer surface of one or both of the substrates 102. Note that the coatings can, but need not, cover an entire outer surface. Suitable non-limiting examples of AR coatings can include a monolayer coating or multi-layer coating of metal oxides, metal fluorides, or other such materials, which may be deposited onto the outer surface (s) of the substrates 102 (i) and/or (ii) or, alternatively onto self-supporting films that are applied to the substrate 102 outer surface(s), through application means such as vacuum deposition and sputtering techniques as are well known in the art. Suitable non-limiting examples of IR reflective coatings can include very thin, partially transparent metallic layers such as NiCr and/or or gold layers applied, for example, by PVD metallization methods. Such materials and application means are available from Creavac Vakuumbeschechtung GmbH of Dresden, Germany. Suitable examples of IR reflective coatings (e.g., Laser Gold and Laser Black) also are available from Epner Technology, Inc. Also, suitable IR reflective coatings can include the silver-based coatings available under the tradename AgHT™, and the gold-based coating available under the tradename AuARE™, from CPFilms Inc. of Canoga Park, Calif. Suitable non-limiting examples of IR absorbing coatings are coatings which comprise IR absorbing dye materials, for example, those which are photochemically stable under ambient light conditions, and which absorb light within the near-IR region of the spectrum, for example, 5,5'-dichloro-11-diphenylamino-3,3'-diethyl-10,12-ethylenethiatricarbocya-nine perchlorate (which provides peak IR absorption at about 830 nm); 2,4-di-3-guaiazulenyl-1,3-dihydroxycyclobutenediylium dihydroxide, bis (inner salt) (which provides peak IR absorption about 780 to about 800 nm); and 1-butyl-2-[2-[3-[(1-butyl-6-chlorobenz[cd]indol-2(1H)-ylidiene)ethylidene]-2-chloro-5-methyl-1-cyclohexen-1-yl]ethenyl]-6-chlorobenz[cd]indolium tetrafluoroborate (which provides peak IR blocking at about 900 to about 1000 nm).

Transitional coatings may also be employed. As used herein the term "transitional coating" means a coating that aids in creating a gradient in properties between two coatings. For example, although not limiting herein, a transitional coating can aid in creating a gradient in hardness between a relatively hard coating and a relatively soft coating. Examples of transitional coatings include radiation-cured acrylate-based thin films.

Suitable examples of protective coatings can include, but are not limited to, abrasion-resistant coatings comprising organo silanes, abrasion-resistant coatings comprising radiation-cured acrylate-based thin films, abrasion-resistant coatings based on inorganic materials such as silica, titania and/or zirconia, organic abrasion-resistant coatings of the type that are ultraviolet light curable, oxygen barrier-coating, UV-shielding coatings, and combinations thereof. For example, the protective coating can comprise a first coating of a radiation-cured acrylate-based thin film and a second coating comprising an organo-silane. Examples of commercial protective coatings products include SILVUE® 124 and HI-GARD® coatings, available from SDC Coatings, Inc. and PPG Industries, Inc., respectively.

Various embodiments disclosed herein will now be illustrated in the following examples.

EXAMPLES

Section 1 describes the preparation of the electrochromic solution 110 and index matching of the solution and lens. Section II describes the fabrication of the electrochromic iris 100. Section III describes the methods used to test the electrochromic iris 100 of the present invention and a fixed aperture Comparative Example. Section IV describes the imaging results for the Example and Comparative Example presented as FIGS. 1-9.

Section I—Preparation of Electrochromic Solutions
Part A—Preparation of n-Heptyl Viologen Tetrafluoroborate Preparation of n-heptyl viologen tetrafluoroborate was carried out in two steps. The following materials were purchased from Aldrich without purification: n-heptyl bromide, 99% (629-04-9), 4,4'-bipyridine (553-26-4) 98%, acetonitrile (75-05-08), sodium tetrafluoroborate (13755-29-8) and tetrabutylammonium tetrafluoroborate (429-42-5).

Step 1

Preparation of Dibromides

To a 1,000 ml three necked round bottom flask was added acetonitrile (200 mL), 4,4'-dipyridine (0.08 mole, 12.5 g) and of n-heptyl bromide (0.25 mole, 45.23 g) and the solution was agitated by a mechanical stirrer. The resulting clear yellow solution was heated to boiling over about a 30 minute interval. After about 2 hours and 30 minutes, the solution turned darker and yellow precipitates formed. The solution was refluxed at 80° C. for about 16 hours and afterwards was cooled to room temperature. The yellow precipitate was separated by filtration, washed with fresh acetonitrile and air dried yielding 26.5 g of the product. The recovered product was used in Step 2 without further purification.

Step 2

Salt Exchange/Purification

Sodium tetrafluoroborate (0.22 moles, 24.15 g) was dissolved in approximately 700 mL of deionized water in a one liter beaker with mixing and the product of Step 1 (0.045 mole, 23.1 g) was added. The yellow product of Step 1 gradually changed color to white at ambient temperature. After 2 hours of mixing, the white precipitate was recovered by filtration using a Büchner funnel with No. 54 filter paper to yield about 26 g of product. The recovered product was dried under vacuum in an oven at 90° C. for several hours yielding 21.4 g of product. Analysis by an area % HPLC assay revealed it to be 99.9%. The product (10 g) was recrystallized from 250 mL of deionized water in a 600 mL beaker. The resulting suspension was heated and became clear when the temperature was about 90° C. The hot clear solution was filtered through No.

40 filter paper into two 300 mL Erlenmeyer flasks that were heated on the same hot plate. The resulting filtrates were allowed to cool to ambient temperature and a crystalline precipitate formed. The recrystallized product (6.8 g) was analyzed by an area % HPLC assay which indicated 100% without detectable impurities.

Part B—Preparation of Cell Solution

The following materials were obtained from Aldrich without purification: propylene carbonate (108-32-7), benzonitrile (100-47-0), 5,10-dihydro-5,10-dimethylphenazine (DMPZ, 15546-75-5), and polyvinylpyrrolidone (PVP,) with typical M, =1, 3 mM (9003-39-8). TINUVIN® P ultraviolet light absorber was obtained from Ciba Geigy. Refractive index at 589 nm/20° C. was measured through a digital refractometer from ATAGO, Automatic Digital Refractometer model RX-7000a following the manufacturers recommended procedures in the Instruction Manual Cat. No. 3262.

Step 1

Preparation of Solvent Mixture

Benzonitrile (50.88 g) and propylene carbonate (49.12 g) were mixed together in a suitable container. The refractive index of the resulting mixture was 1.4816.

Step 2

Preparation of a 3% PVP Solvent Mixture

Polyvinylpyrrolidone (3 g) was dissolved into the product of Step 1 (97.0 g). The refractive index of the resulting solution was 1.4819.

Step 3

Preparation of Stock Solution

Into a suitable container was added the product of Step 2 (20.0 g). Tetrabutylammonium tetrafluoroborate (0.10 M, 0.6585 g) and TINUVIN® P ultraviolet light absorber (0.0200 g) were added with mixing. The refractive index of the resulting solution was 1.4821.

Step 4

Preparation of Electrochromic Cell Solution (0.06M)

n-Heptyl viologen tetrafluoroborate (0.1584 g) was dissolved into the product of Step 3 (5.0 g) resulting in a clear colorless solution. To the solution was added DMPZ (0.0631 g) and the color of the clear solution became greenish. The refractive index of the resulting solution was 1.4844.

Part C—Index Matching of the Electrochromic Cell Solution to the N-FK5 Hemispheric Lens In order to match the refractive index of 1.4890 of N-FK5 glass 102 (Schott) used for the electrochromic iris 100 lens at a wavelength of 550 nm, it was determined that the cell solution 110 needed to match a refractive index measured at 589 nm of 1.4851+−0.0003, based on the optical dispersion curve. The optical dispersion curve was determined using a Metricon Prism Coupler, Model 2010M and was calculated using the Cauchy fit module of the instrument operating software version 1.81.

The adjusting of the refractive index from 1.4844 to 1.4851 was carried out by adding a 3 weight % PVP solution in 100% benzonitrile (0.0374 g) to the product of Step 4 (2.7550 g). The resulting solution was stirred with about 0.5 g of 4A molecular sieve beads (8-12 mesh) for about 16 hours and filtered through a 0.45 micron cartridge. The resulting refractive index at 589 nm was 1.4850. Since the refractive index obtained was within ±0.0003, no further adjusting was needed.

Section II—Fabrication of the Electrochromic Iris

The following materials were used: two Indium tin oxide 104 coated glass slides 102 measuring 25 mm by 25 mm by 1.1 mm, item X-178 from Delta Technologies; two 30 gauge needles; a hemispherical lens 106 prepared from a 2.5 mm ball lens of N-FK5 glass obtained from MSPT, Inc. Mountain View, Calif. that was ground down by Opticfab Corp. Santa Clara, Calif. until resulting in a hemispherical lens 106 having the curvature of the 2.5 mm ball lens and a thickness of about 300 microns; Loctite® M-121HPTT™ Hysol® Medical Device Epoxy Adhesive; and DYMAX Light Weld® 429-gel glass adhesive;

Onto one of the ITO 104 coated glass slide 102 a rectangular space measuring 20 by 25 mm was used to locate the components used to prepare the cell, This space was defined by one edge where a 30 gauge needle was positioned at one top corner and another 30 gauge needle was positioned at 5 mm from the edge of the other top corner. The hemispherical lens 106 was placed in the center of the 20 by 25 mm rectangle. Another ITO 104 coated glass slide 102 was placed over the rectangle so that a 5 mm edge from each of the ITO 104 coated slides was exposed. The resulting assembly was held together with miniature binder clips attached at the top and bottom of the assembly. The epoxy adhesive 108 was used to fill the gap at two opposite ends of the cell without touching the needles. The cell was allowed to cure at ambient temperature overnight to fix the thickness of the cell and then the needles were removed. More epoxy adhesive 108 was used to fill the cell gap of all four sides except an approximately 0.2 mm inlet at one edge. The cell was then cured at 105° C. for one hour to complete the process. Afterwards the cell was placed with the inlet down into a beaker containing the index matched electrochromic cell solution 110 of Part C and placed into a vacuum chamber for 5 minutes at about 30 inches of mercury. The vacuum was slowly replaced with nitrogen gas to enable the cell solution to be drawn up into the assembly 100. After the cell was vacuum filled with the product of Part C the opening was sealed with the DYMAX Light Weld® 429-gel glass adhesive and cured by exposure to ultraviolet light in a DYMAX®5000-EC chamber for 7 seconds. The resulting cell was cleaned with acetone and both of the exposed ITO 104 coated surfaces were covered with copper conductive tape (about 6.3 mm wide) coated on the attached side with a conductive adhesive to serve as a busbar for easy electrical connection. The resulting cell 100 was exposed to ultraviolet light in the DYMAX® 5000-EC chamber again for 7 seconds. The busbars of the cell 100 were connected to a LAMBA Model LLS5018 power supply. When the voltage was increased to greater to 0.6 V to 1.2 V the cell colored. When the voltage was decreased below 0.6 V the cell 100 began bleaching to the original colorless appearance.

Section III—Methods Used to Test the Electrochromic Iris 100

The product 100 of Section II was placed in a mounting fixture about 40 to 60 mm beneath the objective of an Olympus SZH10 zoom stereomicroscope being illuminated from the diffuse light source with maximum intensity. The microscope was set up using the 1.5× objective with the zoom setting set for 2.5. The aperture on the microscope was set to value 6. The mounting fixture was connected to a stage containing a manual plastic shutter.

In order to minimize the effects of room lighting, the eyepieces of the microscope were covered with black plastic covers and black light blocking material. Black plastic light blocking material was also wrapped around the microscope stage area. The busbar areas of each side of the electrochromic cell 100 were attached to a LAMBDA LLS5008 digital power supply set to deliver 1.2 volts.

Images were acquired using an AVT Stingray 145C color digital camera mounted onto the microscope using a C-Mount connector. The digital camera was attached to a computer using a FireWire 800 cable and Firewire PCI card. Images were acquired using AVTs software (SmartView 1.10). The camera was set up using the following settings: Format=F7 Mode 0, ISO speed=400, Width=1388, Length=1038, Integration time=140 milliseconds, high signal to noise ratio=8 images, frames per second=0.85, and all auto-adjusting features, such as white balance, were turned off. Images were acquired for 300 images at a rate of 0.85 frames per second. Of the 300 images, approximately 24 images were acquired with the voltage to the sample being off, about 100 images with the voltage on at 1.2 V, about 100 images with the voltage off and about 75 dark images (manual shutter between the light source and the sample closed). The dark images were averaged and used to subtract out the dark noise from the camera system in the profiles shown below. The images were saved in RAW format.

The data was analyzed using Igor Pro (version 6.1×) from WaveMetrics, customized to auto analyze all the images acquired during the data acquisition. The images were loaded into Igor Pro and converted from RAW format to RGB format using a debayering function of RGRG . . . GBGB . . . as indicated in the AVT Stringray manual. Besides converting the images from RAW to RGB, no additional image processing was performed on the images analyzed and represented by FIGS. 1-9. The images for the "no aperture" in FIG. 7 and Comparative Example "fixed aperture" (300 micron precision pinhole, mounted, from Edmund Optics, NT56-285) in FIGS. 8 and 9 were collected using the same set-up except the integration time was 120 milliseconds and the frames per second was 0.98. The intensity profile extracted from each analyzed image was along a vertical line through the center of the image.

In addition to analyzing the images as a function of time, the software was programmed to display a cross-sectional "intensity" profile of the iris 100 as a function of time. Note that the profiles shown are from data with the average dark image information subtracted out along the same coordinates as the profile. The average dark image was an average of 60 to 75 frames with the plastic shutter in the closed position (no light present). Also note that the profiles were extracted from vertical rows of the data and averaged over +/−8 pixels to improve the signal to noise.

Section IV—Imaging Results

Figure 2:
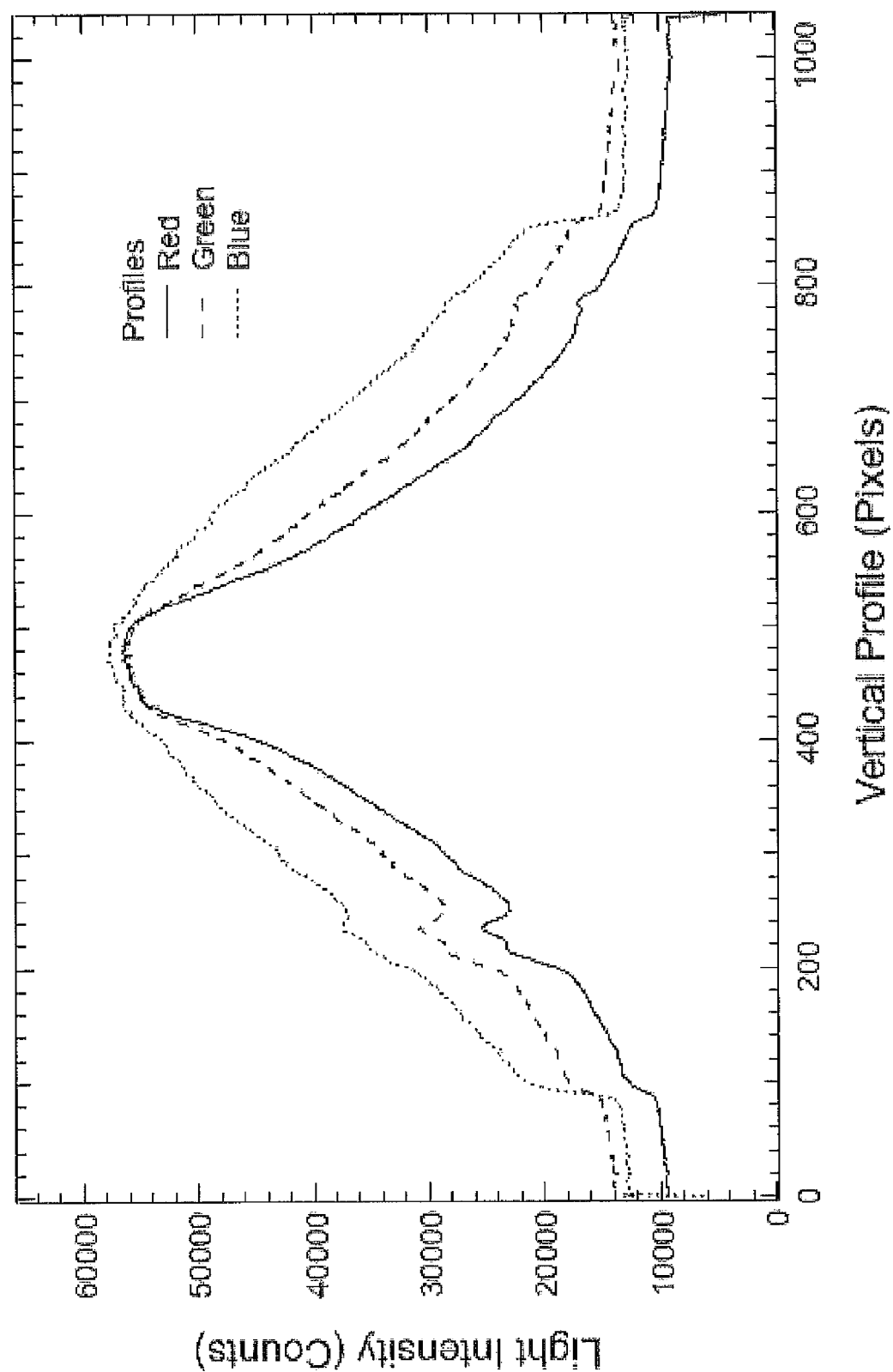
FIG. 2 is a profile of an image of the aperture of the Example after about 1 second of applied voltage.
Figure 3:
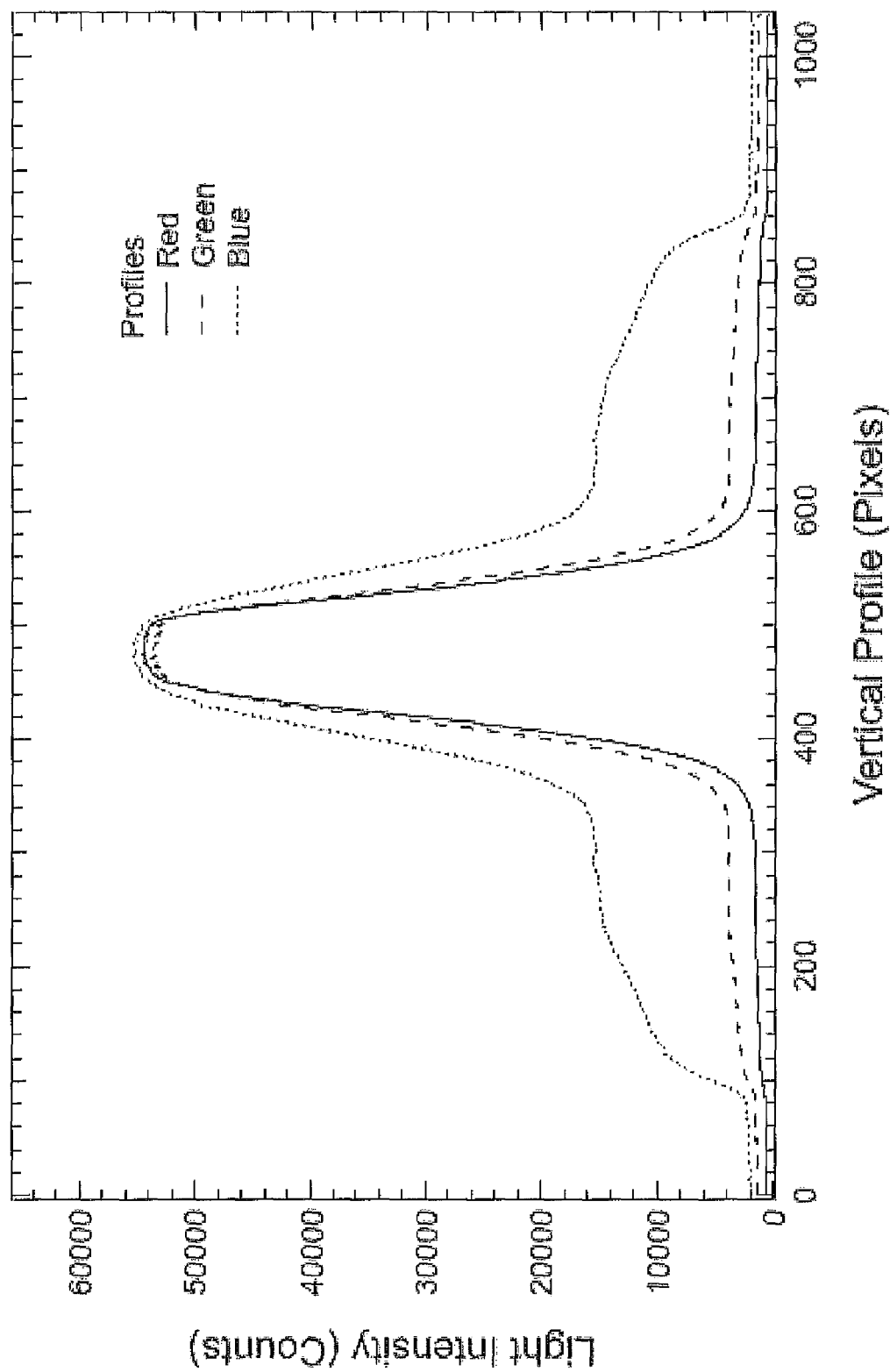
FIG. 3 is a profile of an image of the aperture of the Example after about 4 seconds of applied voltage.
Figure 4:
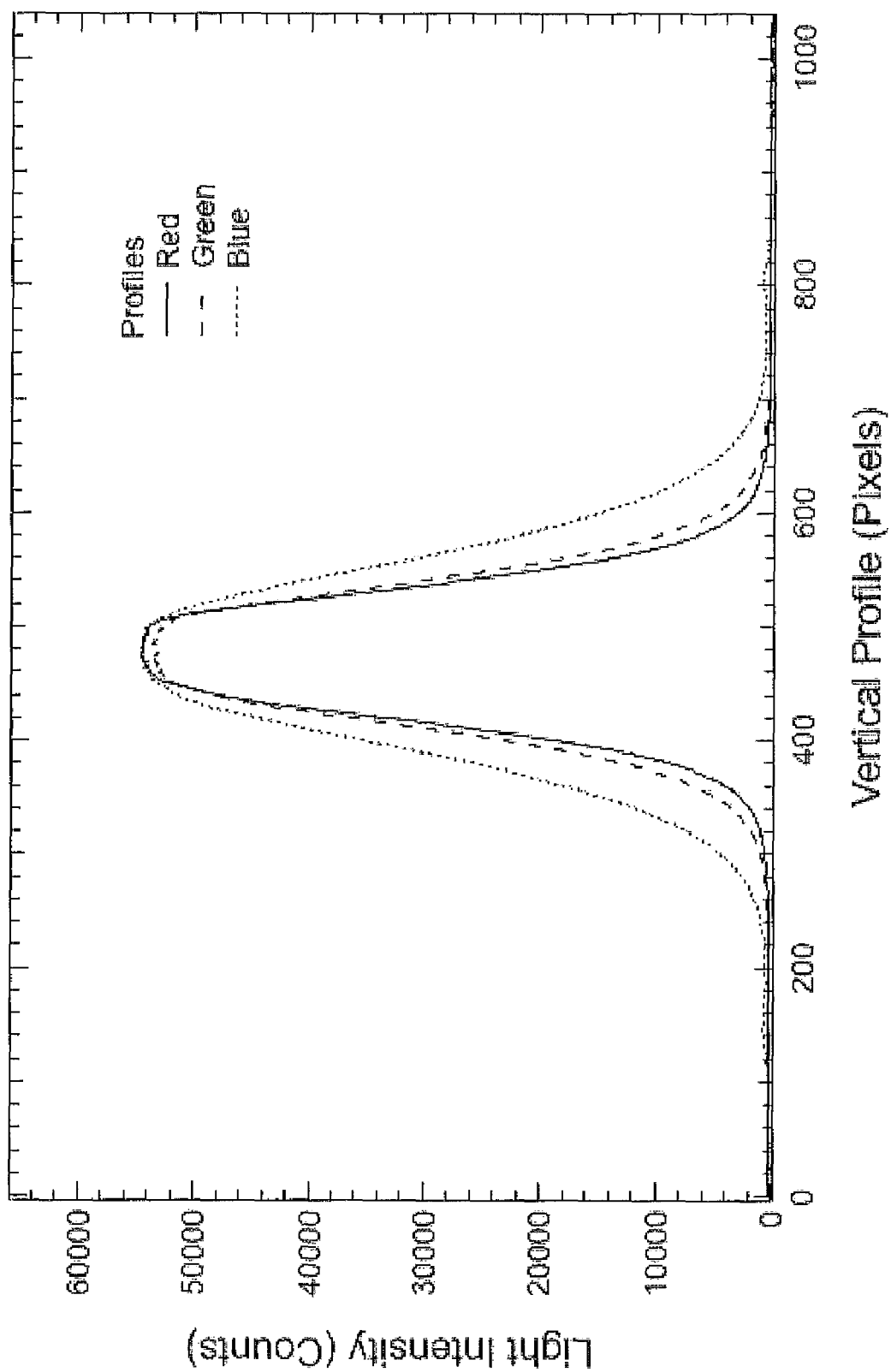
FIG. 4 is a profile of an image of the aperture of the Example after about 18 seconds of applied voltage.
Figure 5:
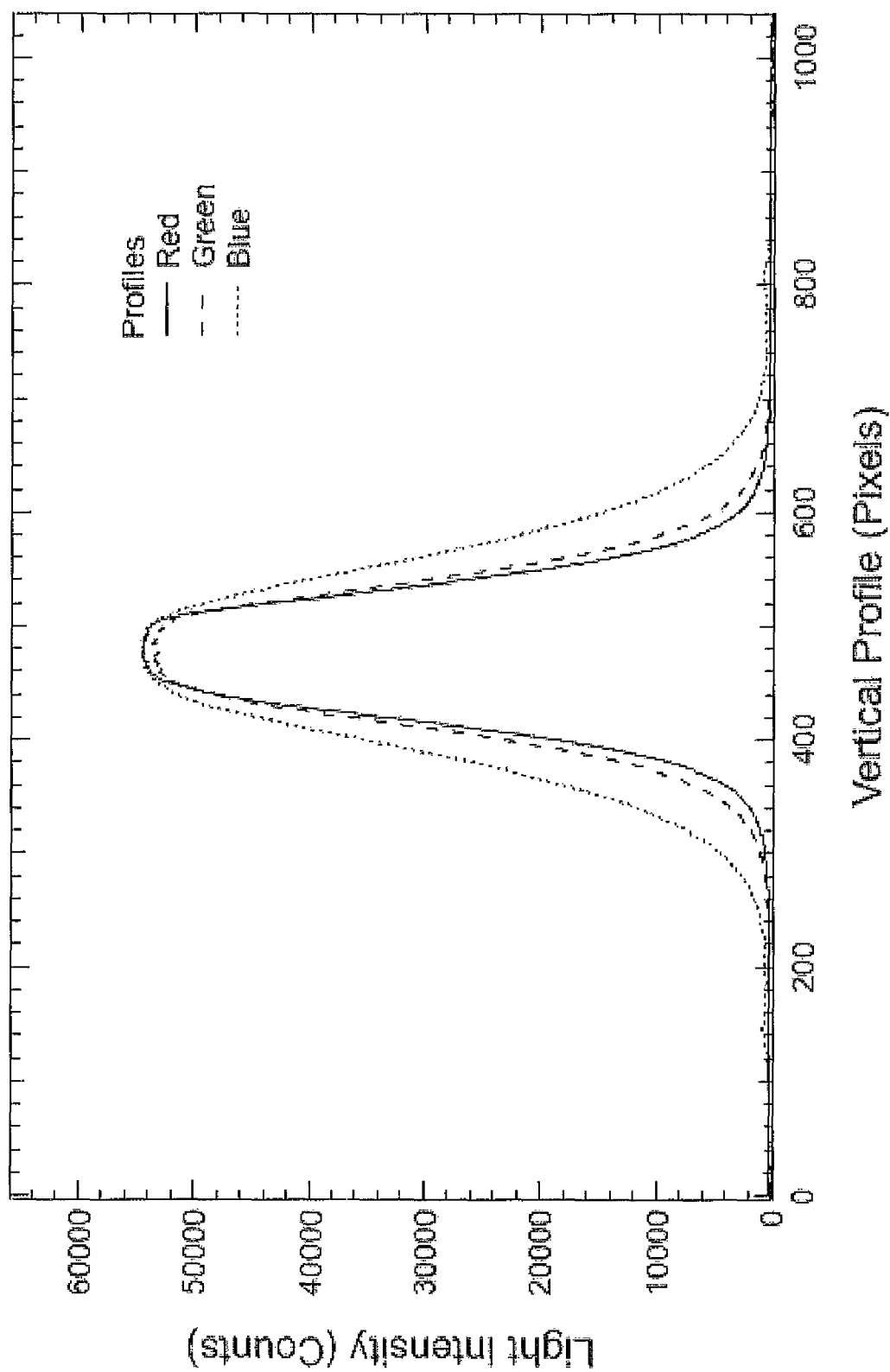
FIG. 5 is a profile of an image of the aperture of the Example after about 110 seconds of applied voltage.
Figure 6:
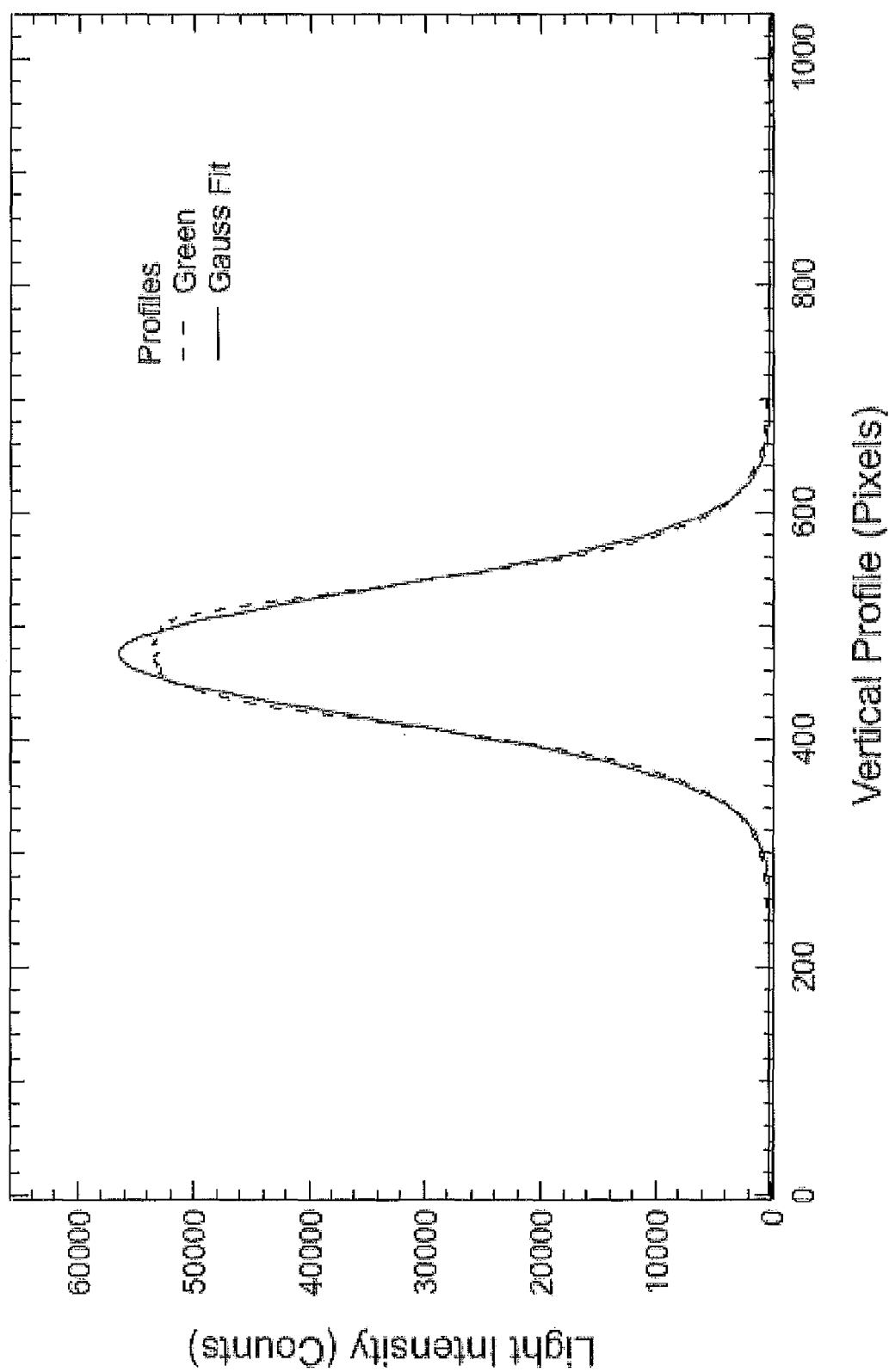
FIG. 6 is a profile of an image with Gaussian curve fitting applied to the Green line shown in FIG. 5.
Figure 7:
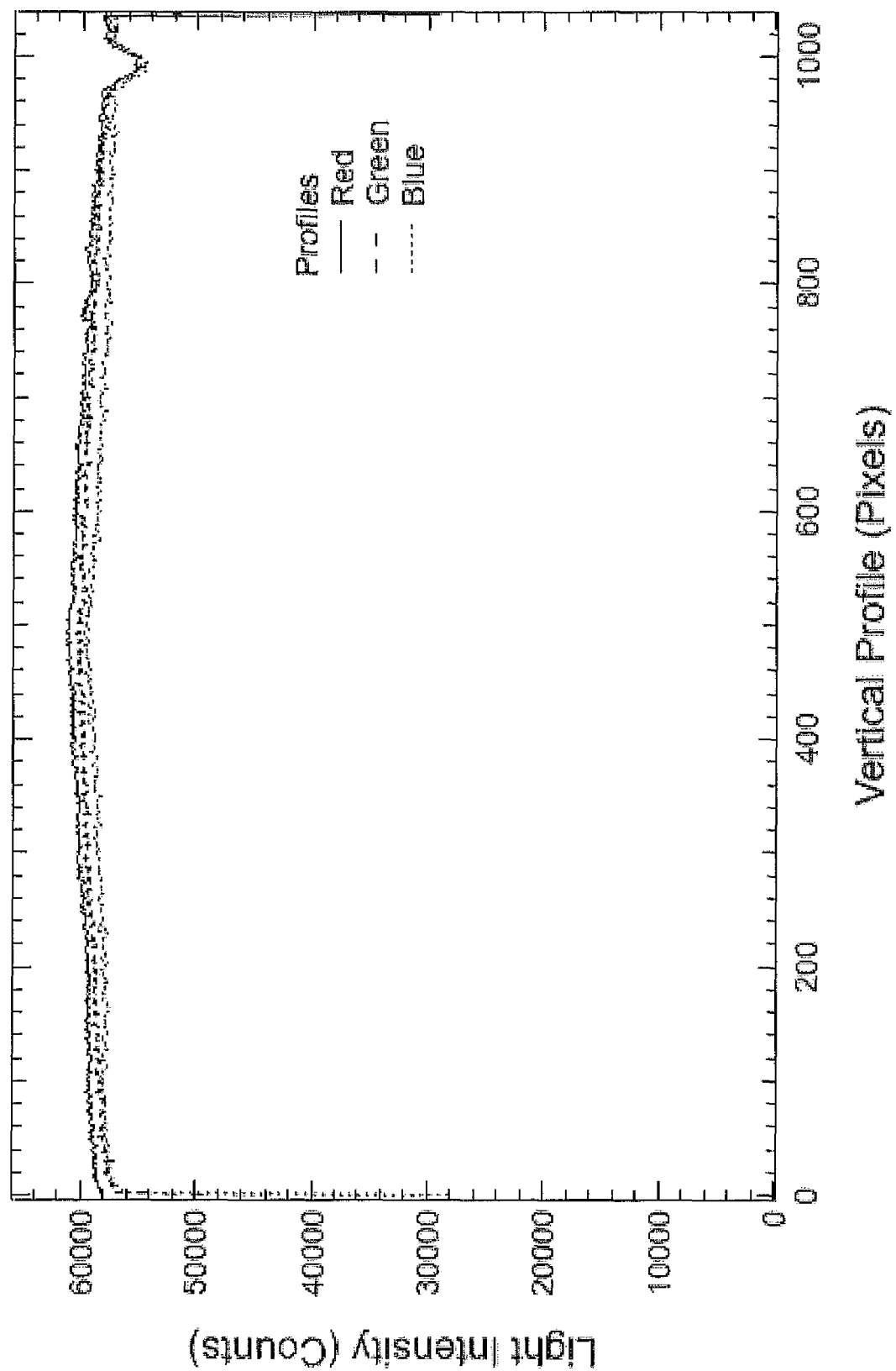
FIG. 7 is a profile of the image resulting when no aperture was present.
Figure 8:
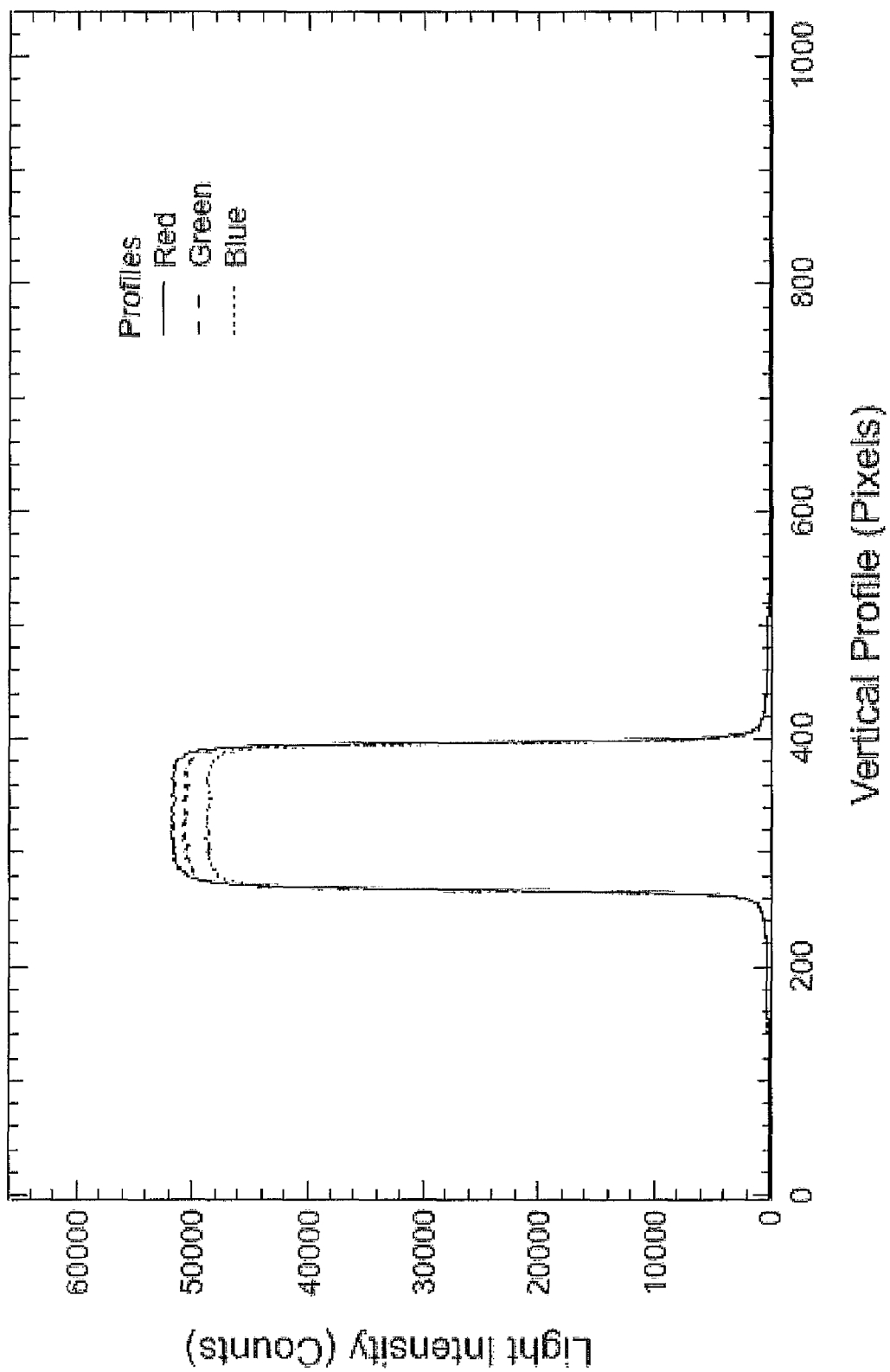
FIG. 8 is a profile of the image resulting when the fixed aperture of the Comparative Example was present.
Figure 9:
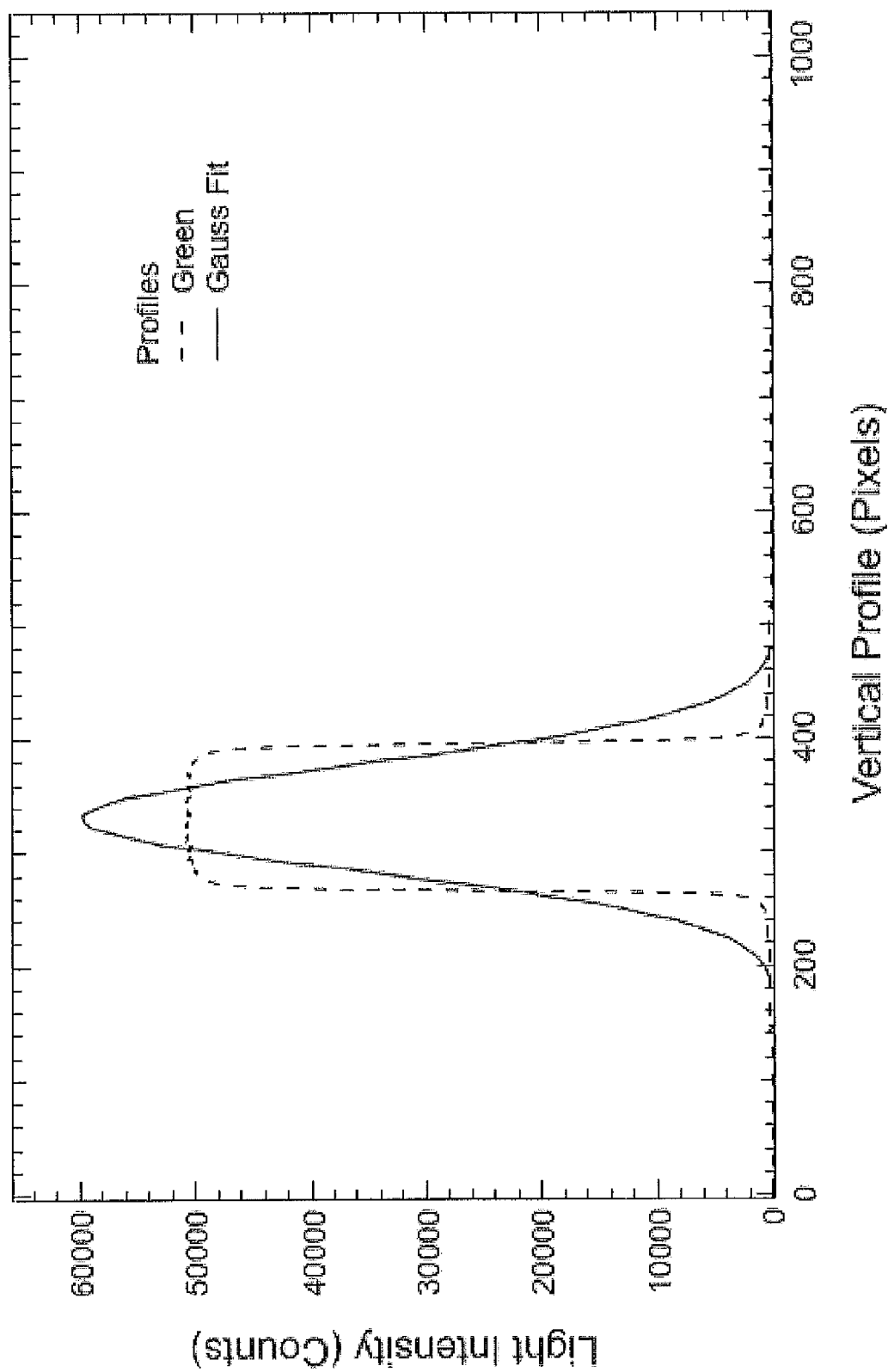
FIG. 9 is a profile of an image with Gaussian curve fitting applied to the Green line shown in FIG. 8.

The intensity profiles for the electrochromic iris 100 were derived from images taken for FIG. 1 at time 0, for FIG. 2 at about 1 second, for FIG. 3 at about 4 seconds, for FIG. 4 at about 18 seconds, and for FIG. 5 at about 110 seconds. FIG. 6 shows the curve fitting of a Gaussian curve onto the green response curve line of FIG. 5 after 110 seconds. FIG. 7 represents the profile with no aperture in place. FIG. 8 represents the Comparative Example of a fixed 300 micron aperture. The analyzed images of the iris 100 were collected via the SmartView 1.10 software (with auto white balance applied before data acquisition and then white balance was fixed) and displayed in Igor Pro. The intensity profiles of the figures show the red, green and blue (solid curve, large dashes and small dashes, respectively) curves that were derived from the vertical rows of data on the images.

The profiles of FIGS. 1-6 demonstrate the function of an electrochromic apodized iris 100. When the voltage is off, the iris 100 is full open in FIG. 1. When 1.2 V are applied, the electrochromic iris 100 activates forming an apodized aperture 100 as demonstrated after about 1 second in FIG. 2, after about 4 seconds in FIG. 3, after about 18 seconds in FIG. 4 and after about 110 seconds in FIG. 5. FIG. 6 demonstrates how closely the green response (dashed curve) of FIG. 5 closely represents a Gaussian distribution (solid curve), which is useful for apodization. The Gaussian width parameter obtained using Igor Pro's built in Gaussian fit routines (with the resulting width parameter equal to Sqrt(2)*standard error) was converted to a more traditional beam waist calculation for Gaussian beams [2*standard error] by dividing the Igor Pro width parameter by Sqrt(2) and multiplying that result by 2. The Gaussian width (beam waist) of the apodized aperture was about 316 microns. The Comparative Example "fixed aperture" profile (width about 300 microns+/−10 microns) is shown in FIG. 8 and applied Gaussian curve fitting to the profile in FIG. 9. The profile in FIG. 9 clearly demonstrates the difference between an apodized aperture 100 (solid curve) and a fixed aperture (dashed curve). FIG. 7 demonstrates a profile with no aperture present.

Whereas particular embodiments of this invention have been described above for purposes of illustration, it will be evident to those skilled in the art that numerous variations of the details of the present invention may be made without departing from the invention as defined in the appended claims.

Therefore, we claim:

1. An optical element comprising an electrochromic apodized aperture having variable light transmittance in response to the magnitude of an applied electrical voltage, the apodized aperture comprising:
  (i) a first substrate having a planar inner surface and an outer surface, wherein the planar inner surface has an at least partial layer of transparent conductive material thereover;
  (ii) a second substrate having an outer surface and a non-planar inner surface opposing the planar inner surface of the first substrate, wherein the non-planar inner surface has an at least partial layer of transparent conductive material thereover;
  (iii) an electrochromic medium disposed between the planar inner surface of the first substrate and the non-planar inner surface of the second substrate; and
  (iv) wherein a center region of the electrochromic apodized aperture defines a pupilary region, and wherein the transparent conductive material on at least one of the inner surface of the first substrate (i) and the inner surface of the second substrate (ii) is electrically isolated in the pupilary region.

2. The optical element of claim 1, wherein the refractive indices of the second substrate and the electrochromic medium are substantially the same.

3. The optical element of claim 1, wherein the refractive index of the first substrate is substantially the same as the refractive indices of the second substrate and the electrochromic medium.

4. The optical element of claim 1, wherein the outer surface of the first substrate (i) and the outer surface of the second substrate (ii) are substantially planar.

5. The optical element of claim 1, wherein the at least partial layer of transparent conductive material on the planar inner surface of the first substrate (i) and the at least partial layer of transparent conductive material on the non-planar surface of the second substrate (ii) provides a surface conductivity ranging from 1 to 1000 ohms/square.

6. The optical element of claim 1, wherein the at least partial layer of transparent conductive material on the non-planar inner surface of the second substrate (ii) opposes and is spaced from the at least partial layer of transparent conductive material on the planar inner surface of the first substrate (i).

7. The optical element of claim 1, wherein the non-planar inner surface of the second substrate (ii) is essentially free of the transparent conductive material in the pupilary region.

8. The optical element of claim 1, wherein the electrochromic medium comprises a solvent-phase electrochromic medium.

9. The optical element of claim 8, wherein the solvent-phase electrochromic medium is in the form of a liquid.

10. The optical element of claim 1, wherein the non-planar inner surface of the second substrate is convex.

11. The optical element of claim 1, wherein the apodized aperture is characterized by a Gaussian radial transmittance curve.

12. The optical element of claim 1, wherein the thickness of the electrochromic medium increases along a radius of the apodized aperture.

13. The optical element of claim 1, wherein the thickness of the electrochromic medium varies with the non-planar inner surface of the second substrate.

14. The optical element of claim 1, wherein the conductive material comprises a transparent conductive material selected from carbon nanotubes, gold, tin oxide, fluorine-doped tin oxide, and/or indium tin oxide.

15. The optical element of claim 14, wherein the polymeric substrate comprises polycarbonates, polyurethanes, poly(cyclic) olefins, polystyrenes, polymethacrylates, co-polymers thereof, or mixtures of any of the foregoing.

16. The optical element of claim 1, wherein the first substrate and the second substrate comprise the same materials.

17. The optical element of claim 16, wherein the first substrate and the second substrate comprises glass.

18. The optical element of claim 17, wherein the first substrate and/or the second substrate comprises glass having a refractive index of 1.40 to 1.75.

19. The optical element of claim 16, wherein the first substrate and/of the second substrate each comprises a polymeric substrate.

20. The optical element of claim 19, wherein the first substrate and/or the second substrate comprises a polymeric substrate having a refractive index of 1.30 to 1.75.

21. The optical element of claim 1, wherein the first substrate (i) and the second substrate (ii) are transparent.

22. The optical element of claim 1, wherein the electrochromic medium comprises phenazine compounds and/or viologen compounds.

23. The optical element of claim 1, wherein the electrochromic medium comprises propylene carbonate, benzonitrile, and/or phenoxyacetonitrile.

24. The optical element of claim 1, wherein the electrochromic apodized aperture further comprises (iv) at least one seal member about the outer perimeter of the apodized aperture and in contact with the first substrate (i), the second substrate (ii), and the electrochromic medium (iii).

25. The optical element of claim 1, wherein the outer surface of the first substrate (i) and/or the outer surface of the second substrate (ii) is at least partially coated with at least one coating chosen from protective coatings, antifogging coatings, oxygen barrier coatings, antireflective coatings, IR absorbing coatings, IR reflective coatings, and/or conventional reflective coatings.

26. An optical element comprising an electrochromic apodized aperture having variable light transmittance in response to the magnitude of an applied voltage, the apodized aperture comprising:
 (i) a first substrate having an outer surface and a planar inner surface, and
 (ii) a second substrate having an outer surface and a convex inner surface opposing and spaced from the planar inner surface of the first substrate to form a cavity therebetween, wherein each of the planar inner surface and the convex inner surface has an at least partial layer of transparent conductive material thereover, the conductive material comprising indium tin oxide; and
 (iii) an electrochromic medium disposed within the cavity wherein the refractive indices of the second substrate, and the electrochromic medium differ by not more than +/−0.003.

27. The optical element of claim 26, wherein the refractive indices of the first substrate (i), the second substrate (ii), and the electrochromic medium (iii) differ by not more than +/−0.003.

28. The optical element of claim 26, wherein the outer surface of the first substrate (i) and the outer surface of the second substrate (ii) are substantially planar.

29. The optical element of claim 26, wherein the electrochromic apodized aperture further comprises (iv) at least one seal member about the outer perimeter of the apodized aperture and in contact with the first substrate (i), the second substrate (ii), and the electrochromic medium (iii).

30. The optical element of claim 26, wherein a center region of the electrochromic apodized aperture defines a pupilary region, and wherein the transparent conductive material on at least one of the inner surface of the first substrate (i) and the inner surface of the second substrate (ii) is electrically isolated in the pupilary region.

31. The optical element of claim 30, wherein the non-planar inner surface of the second substrate (ii) is essentially free of the transparent conductive material in the pupilary region.

32. The optical element of claim 30, wherein the non-planar inner surface of the second substrate (ii) includes an insulating material covering the transparent conductive material in the pupilary region.

* * * * *